United States Patent [19]

Lo

[11] Patent Number: 5,005,388
[45] Date of Patent: Apr. 9, 1991

[54] AUTOMOBILE STEERING LOCK

[76] Inventor: Tsung I. Lo, 5th Fl., No. 76, Ai-Kuo E. Road, Taipei, Taiwan

[21] Appl. No.: 505,425

[22] Filed: Apr. 6, 1990

[51] Int. Cl.⁵ .............................................. B60R 25/02
[52] U.S. Cl. ........................................ 70/209; 70/226
[58] Field of Search .......... 70/225, 226, 237, 209–212, 70/202, 203

[56] References Cited

U.S. PATENT DOCUMENTS

| | | | |
|---|---|---|---|
| 3,245,239 | 4/1966 | Zaidener | 70/237 |
| 4,738,127 | 4/1988 | Johnson | 70/209 |
| 4,887,443 | 12/1989 | Wang | 70/226 X |

FOREIGN PATENT DOCUMENTS

| | | | |
|---|---|---|---|
| 2718291 | 10/1978 | Fed. Rep. of Germany | 70/226 |
| 853984 | 12/1939 | France | 70/203 |
| 1127524 | 9/1968 | United Kingdom | 70/226 |

Primary Examiner—Lloyd A. Gall
Attorney, Agent, or Firm—Bacon & Thomas

[57] ABSTRACT

An antitheft device for attachment to a steering wheel of an automobile comprising an elongated body member having a passageway extending along an axis therein, a first hook secured to the body member for engagement with a portion of the steering wheel wherein the first hook engages the wheel from the inside thereof with the body member extending outward beyond the periphery of the steering wheel, an elongated rod member adapted to move in telescopic fashion in the passageway of the body member along the axis, a second hook secured to the rod member for engaging the inside portion of the steering wheel diametrically opposed to the first hook, and a lock assembly that allows the rod member to extend with respect to the body member and be selectively locked in any one of a plurality of positions.

7 Claims, 5 Drawing Sheets 5,005,388

AUTOMOBILE STEERING LOCK

FIELD OF THE INVENTION

The present invention relates to an automobile antitheft device, and more particularly to a device for attachment to an automobile steering wheel to prevent complete rotation thereof for securing against unauthorized driving.

BACKGROUND OF THE INVENTION

Antitheft devices which attach to an automobile steering wheel have been known heretofore, as shown in U.S. Pat. No. 4,738,127 to Johnson. Such an antitheft device for attachment to a steering wheel of an automobile includes an elongated body member having a passage extending along a longitudinal axis thereof, an elongated rod member adapted to move in telescopic fashion in the passage of the body member along the axis, opposed hooks for engaging inside portions of the steering wheel and lock means associated with the body member for engaging the rod member within the passage to lock the rod member within the passage in a stationary position with respect to the body member at any one of a plurality of positions. While the antitheft device described above is functional, it nevertheless includes several defects. For example, both extension and retraction telescopic movements of the rod member need a key to unlock the lock means. Another problem with such device is that it presents pry points wherein a rigid pin or arcuate ruler-like thin objects can be inserted through a gap between the passage and periphery of the rod member to reach a spherical bearing of the lock means and further press it down by overcoming the bias force of a spring member thereon to release it from engaging the rod member in a groove thereof that causes the device to unlock.

It is accordingly a primary object of this invention to provide an automobile steering lock that overcomes the foregoing defects associated with prior art devices.

Another object of this invention is to provide an automobile steering lock that performs non-return, extension only, to function as in a locking condition.

A further object of this invention is to provide a locking device wherein the locking mechanism is totally enclosed therein and includes no area susceptible to prying by a crowbar, rigid pin or the like.

DETAILED DESCRIPTION OF A PREFERRED EMBODIMENT

Figure 1:
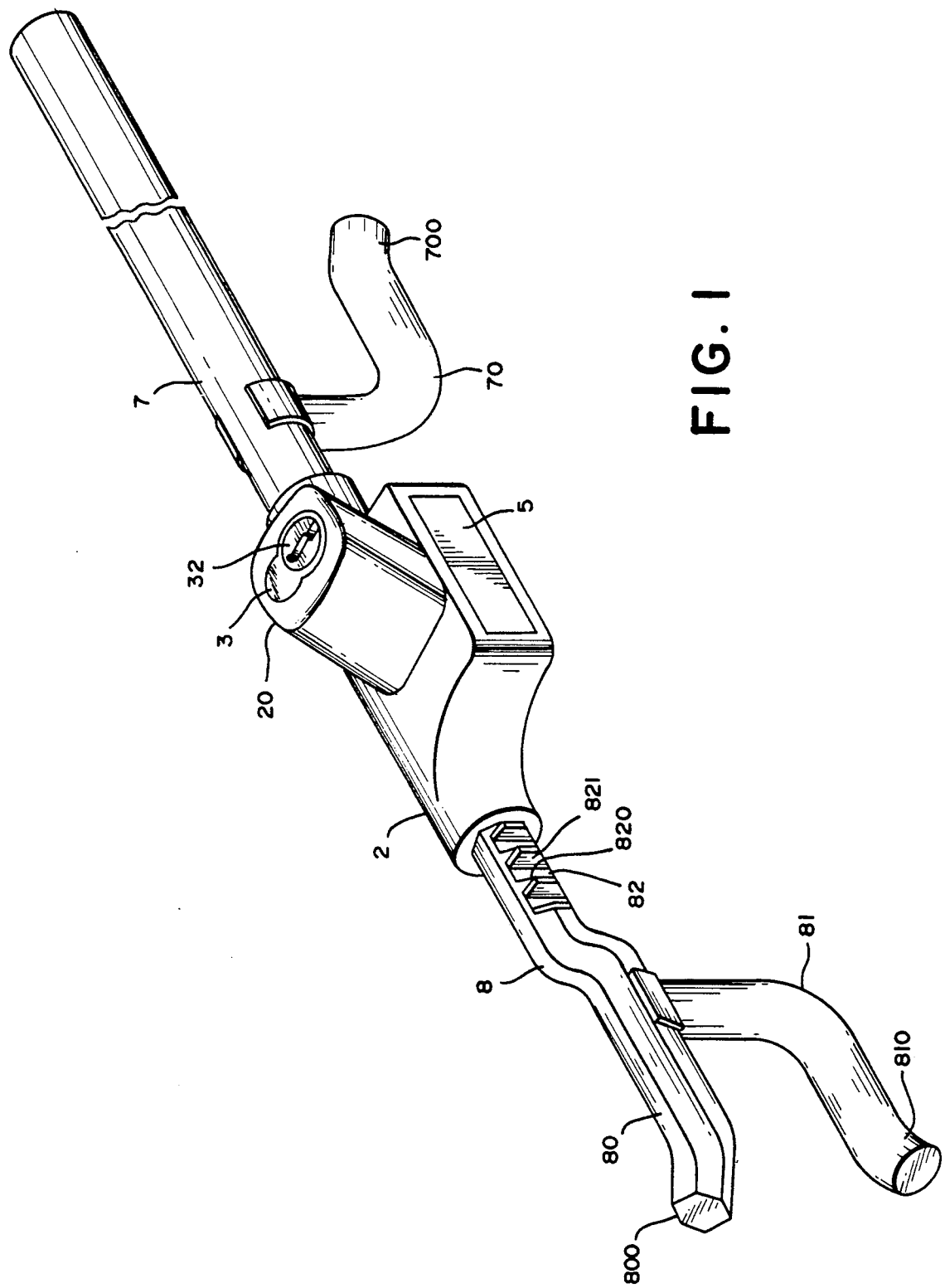
FIG. 1 is a perspective view illustrating a preferred embodiment of the present invention.
Figure 2:
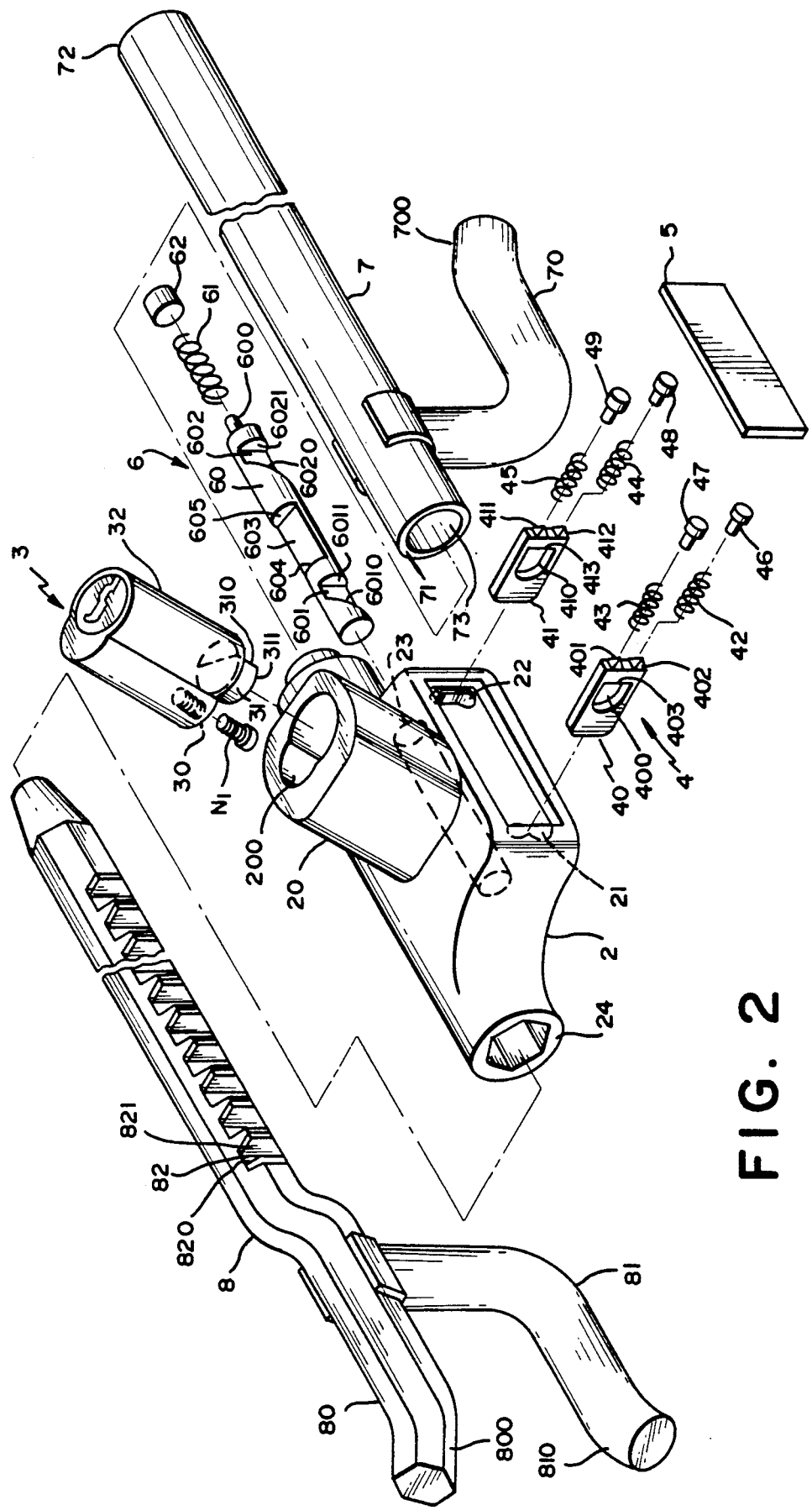
FIG. 2 is an exploded perspective view of the embodiment shown in FIG. 1.

Referring to FIGS. 1 & 2, an automobile steering lock according to the invention comprises an elongated body member 7, an elongated rod member 8 which is dimensioned to extend and retract in telescopic fashion within body member 7, hooks 70, 81 for engaging opposed portions of a steering wheel from the inside thereof and, being respectively provided on the body member 7 and rod member 8, a housing 2 and a locking mechanism including a locking means 3, an actuating means 6 and a locating means 4, being provided within the housing 2 to selectively position and lock rod member 8 stationary with respect to the body member 7 at any one of a plurality of positions.

Said body member 7 includes an elongated tube 7 of circular cross-section having an open end 71 and a closed end 72 and provided with a central longitudinal passage 73 extending from the open end 71 and terminating at the closed end 72. The first generally L-shaped member 70 is fixedly secured to the tube 7 by means of welding to form a hook 70 which opens rearwardly along the body member 7. Said rod member 8 includes an elongated rod 8 of hexagonal cross-section of which the outer diameter is dimensioned slightly less than the diameter of the central passage in the body member 7 to enable rod member 8 to telescope freely within the body member 7. The second generally L-shaped member 81 is fixedly secured to the front end portion 80 of the rod member 8 to form a hook 81 which opens opposite to the hook 70 for engagement with a diametrically opposed portion of a steering wheel. A plurality of notches 82 are axially aligned along a major portion of the rod member 8. Each of notches 82 consists of a vertical side wall 820 disposed substantially perpendicular to the longitudinal axis of the rod 8 and positioned closer to the second hook 81, and a convex or slope side wall 821 positioned further from the second hook 81.

Said housing 2 is connected to the open end 71 of the body member 7 wherein a central passage 24 extends therethrough and communicates with the central passage 73 of the body member 7 and contains the locking mechanism including the locking means 3, the actuating means 6 and the locating means 4.

The housing 2 includes a boss 20 integrally offset and slanted with respect to the longitudinal axis of the body member 7 and having a bore 200 therethrough extending into the housing 2 for firmly receiving the locking means 3 which has a conventional key lock 32 and a locking member 31 of cylindrical shape. The locking member 31 includes an arcuate outer surface 311 and a flat or recess portion 310.

To accomodate the actuating means 6, an elongated compartment 23 disposed substantially parallel to the passage 24 is formed in the housing 2. Said bore 200 of the boss 20 intersects the compartment 23. The actuating means 6 includes a rod-like actuating member 60 having a projection 600 projecting rearwardly from a rear side wall of the actuating member 60 and a biasing spring 61 adapted to be disposed within the compartment 23 with a front end thereof surrounding the projection 600 and abutting against the rear side wall of the actuating member 60. The actuating member 60 is formed with a recess 603 defined by a flat bottom and opposed stop side walls 604, 605 in its middle portion and two spaced notches 601, 602, each of which includes a vertical side wall 6011 or 6021 relatively close to the projection 600 and a convex or slope side wall 6010, 6020, respectively positioned away from the projection 600. A metal disc 62 is provided for a press fit engagement in an open end of the compartment 23 an after assembly for retaining the actuating member 60 and spring 61 in the compartment 23.

To accommodate the locating means 4, a pair of passages 21, 22 are provided extending transversely across the compartment 23 and further intersect the passage 24 in the housing 2. Said locating means 4 includes a pair of tenon-like identical locating members 40, 41, each of which has a front end, as in a first position, protruding from the transverse passage 21 or 22 into the passage 24 to engage one of the notches 82 of the rod member 8, two projections 401, 402 or 411, 412 for retaining front ends of biasing springs 42, 43 or 44, 45 and an opening 400 or 410 forming a vertical rear side wall 403 or 413 and so dimensioned to allow extending through of the actuating member 60 and transversely locating the locating members 40, 41 between a first position, where the front ends of members 40, 41 protrude from the transverse passages 21, 22 into the passage 24 in housing 2 and engage two corresponding notches 82 of the rod member 8 and the rear side walls 403, 413 of the locating members 40, 41 abut against bottoms of notches 601, 602 of the actuating member 60, and a second position, where the front ends of member 40, 41 disengage the notches 82 of the rod member 8 and the rear ends of the locating members 40, 41 are withdrawn into the transverse passages 21, 22. Spring retainers 46, 47, 48 and 49 are provided for retaining rear ends of the biasing springs 42, 43, 44 and 45. The locating members 40, 41, springs 42, 43, 44, 45 and spring retainers 46, 47, 48 and 49 are maintained in the transverse passages 21, 22 by a retainer 5. Spring members 42, 43, 44, 45 are confined within passages 21, 22 in compression such that the locating members 40, 41 are biased towards the passage 24.

Figure 3:
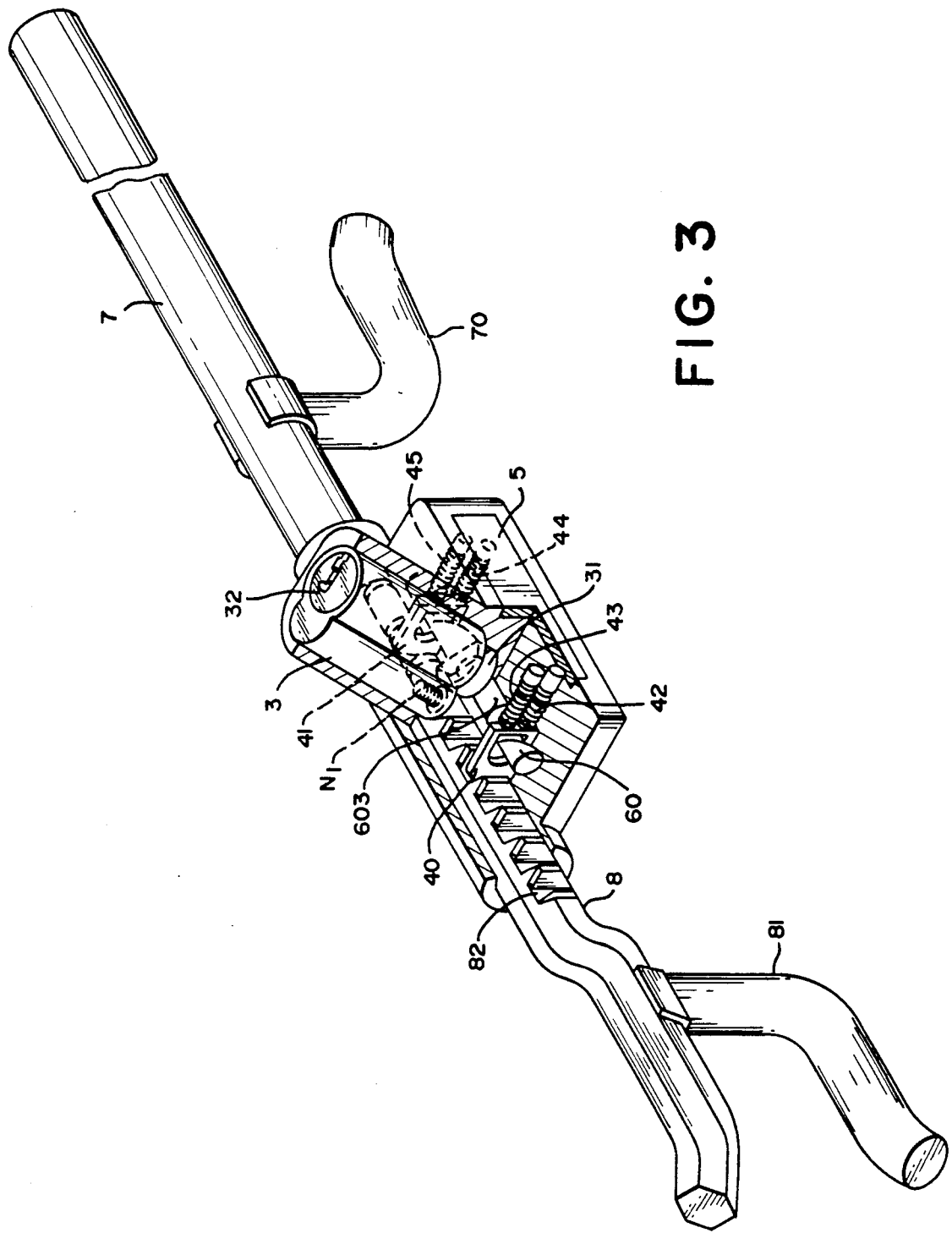
FIG. 3 is a perspective view of the embodiment of this invention wherein the housing is partially cut away.
Figure 4:
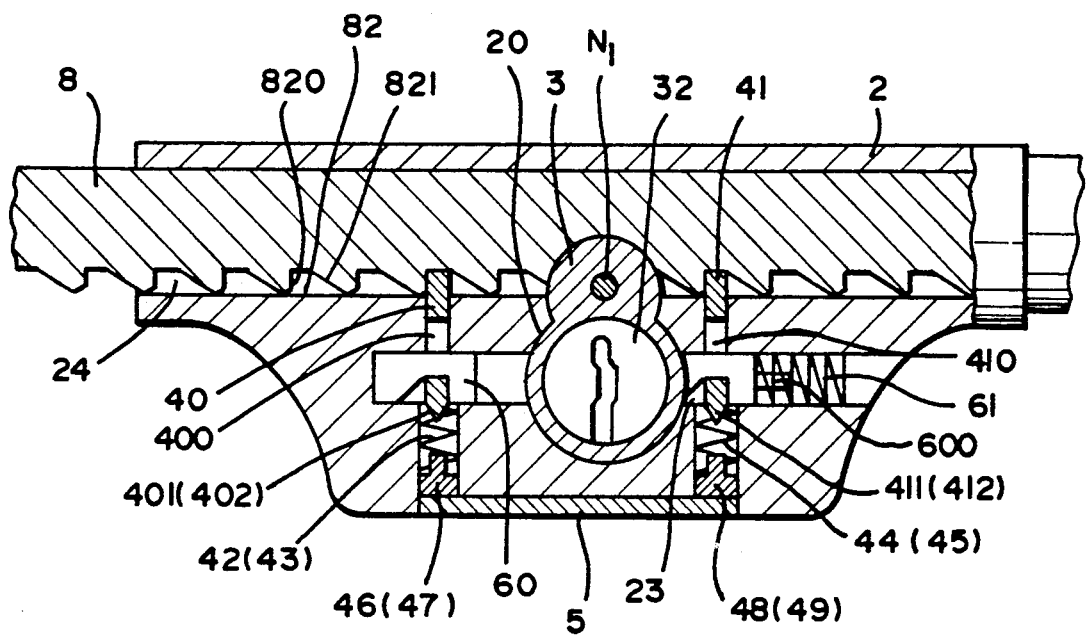
FIG. 4 is a transverse-sectional view of the housing of the steering lock.
Figure 5:
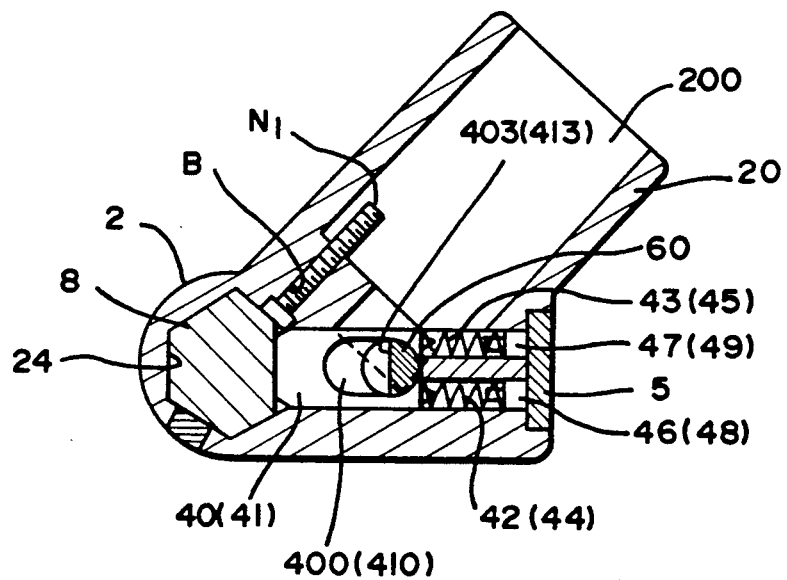
FIG. 5 is a cross-sectional view of the housing of the steering lock.
Figure 6:
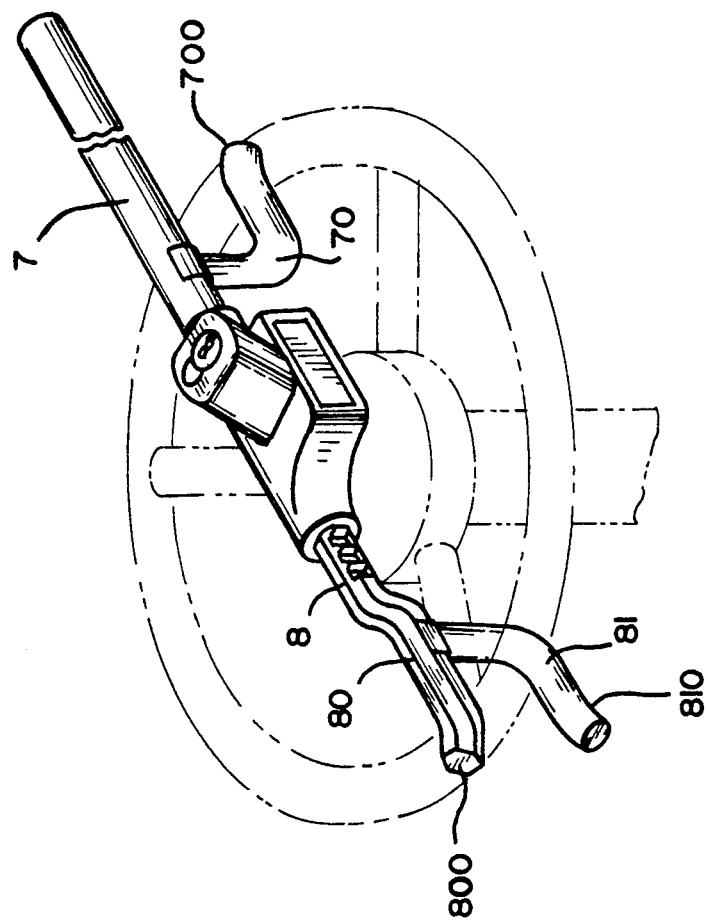
FIG. 6 is a perspective view showing the steering lock installed in a locking position on a steering wheel of a car.

Referring to FIGS. 3, 4 and 5, in assembly, the locating members 40, 41 are slidably fitted in the transverse passages 21, 22, the actuating member 60, which extends through the openings 400, 410 of the locating members 40, 41, is slidably fitted in the compartment 23 wherein the recess 603 thereof faces the bore 200 of the boss 20. The key lock 32 of the locking means 3 is firmly received in the bore 200 of the boss 20 by means of a screw N1 which extends through a bore B formed in a bottom portion of the boss 20 and interconnecting bore 200 and central passage 24 of housing 2, with screw N1 being tightly threaded into a screw hole 30 of locking means 3, as best shown in FIGS. 2 and 5. The locking member 31 of lock 32 extends substantially downwardly into the recess 603 of the actuating member 60.

In operation, when the flat or recess portion 310 of the locking member 31 is oriented rearwardly, as shown in FIGS. 3, 4 and 5, that allows the flat or recess portion 310 of member 31 to abut on the stop side wall 605 close to the projection 600 of the actuating member 60 and the spring 61 is in compression to bias and to push the actuating member 60 forwardly into its first position where the locating members 40, 41 are biased towards rod member 8 into their first position such that the vertical rear side walls 403, 413 abut against bottoms of the notches 601, 602, respectively; of the actuating member 60 and the front ends of the locating members 40, 41 protrude into corresponding notches 82 to lock the device.

Although in locking condition, the convex or slope side walls 821 of the notches 82 allow the rod member 8 of this antitheft device to extend with respect to the body member 7 by overcoming biasing force of the spring members 42, 43, 44, 45 to retract the locating members 40, 41 from the first position into the second position, yet the vertical side walls 820 engaged with the front ends of the locating members 40, 41 prohibit the rod member 8 from retracting telescopic movement with respect to the body member 7. When the flat or recess portion 310 of the locking member 31 is turned away from the position towards and abutting the stop side wall 605, the arcuate outer surface 311 forces the actuating member 60 to slide rearwardly into a second position by overcoming biasing force of the spring 61. The locating members 40, 41 are retracted from the first position into the second position by overcoming biasing force of the spring members 42, 43, 44, 45 and thus releasing the vertical rear side walls 403, 413 from corresponding notches 601, 602 in the actuating member 60. By so doing, the rod member 8 can move in telescopic fashion within the body member 7 by withdrawing the front ends of the locating members 40, 41 from corresponding notches 82 of the rod member 8 into transverse passages 21, 22.

As shown in FIGS. 1 and 2, the hook defined by the front portion 80 and the L-shaped member 81 both of which are formed respectively with front ends 800, 810 extending frontwardly outwardly to provide a divergent opening for facilitating entrance of the portion of the steering wheel. The hook defined by the rear end portion of the body member 7 and the L-shaped member 70 which has a bent end 700 extending rearwardly and outwardly also provide a divergent opening for the same purpose as the former hook.

While the invention has been described with respect to a preferred embodiment thereof, it is obvious that various modifications can be made therein without departing from the spirit of present invention which should be limited only by the scope of the claims.

What is claimed is:

1. An anti-theft device for attachment to the steering wheel of an automobile comprising:
   (a) an elongate tubular member having an open inner end, a closed outer end and an elongate passageway extending along its longitudinal axis from the open inner end towards the closed outer end;
   (b) a first L-shaped member secured to the tubular member and defining a first hook spaced from the open inner end of the tubular member and open towards the closed outer end of the tubular member for engaging a first inner portion of a steering wheel;
   (c) a housing means including an inner end, an outer end and a passageway extending therethrough from the inner end to the outer end, the outer end being secured to the open inner end of the tubular member to place the elongate passageway of the tubular member in axial alignment with the passageway of the housing means;
   (d) a lock means including a downwardly extending locking member having first and second surfaces;
   (e) an elongate compartment formed in the housing means, the compartment extending from the outer end of the housing means towards the inner end thereof and disposed in parallel to the passageway of the housing means;
   (f) an elongate actuating member slidably disposed in the elongate compartment, the actuating member including at least one notch formed therein and defined by a vertical side wall and a sloping side wall, the vertical side wall being positioned closer to the outer end of the housing means than the sloping side wall, and a recess formed in the actuating member and defined by a stop side wall for engagement by the locking member;

(g) a first spring means disposed in the elongate compartment for biasing the actuating member towards the inner end of the housing;

(h) first means for retaining the actuating member and the first spring means in the elongate compartment;

(i) means for securing the lock means to the housing means, whereby the locking member is rotatable between an unlocked position, in which the first surface thereof engages the stop side wall of the recess of the actuating member, and a locking position wherein the second surface thereof engages the stop side wall of the actuating member;

(j) an elongate rod member provided with a plurality of longitudinally spaced notches and telescopically receivable within the axially aligned passageways of the housing means and tubular member, and a second L-shaped member secured to the rod member and defining a second hook open in a direction opposite to the first hook for engaging an opposed second inside portion of the steering wheel;

(k) at least one transverse passageway formed in the housing means and extending across the elongate compartment and intersecting the passageway in the housing means;

(l) a locating member slidably received within the transverse passageway, the locating member including an opening sized to receive the actuating member therethrough and positioning the locating member within the notch of the actuating member, and a second spring means disposed in the transverse passageway for urging the locating member towards the passageway of the housing means, whereby when the actuating member is in the locking position, the locating member engages a notch of the rod member, and when the actuating member is in its unlocked position, the locating member is disengaged from the notch of the rod member; and (m) second means for retaining the locating member and second spring means within the transverse passageway.

2. The anti-theft device of claim 1 further including a plurality of notches formed in the actuating member, a plurality of transverse passageways formed in the housing means and a locating member slidably received within each transverse passageway.

3. The anti-theft device of claim 1 wherein the first surface of the locking member is of arcuate configuration and the second surface of the locking member is of a flat configuration.

4. The anti-theft device of claim 1 wherein each notch of the elongate rod member is defined by a vertical side wall and a sloping side wall, whereby the vertical side wall is positioned closer to the second hook in order to permit only telescopic extension of the elongate rod member relative to the elongate tubular member when the actuating member is in its locking position.

5. The anti-theft device of claim 1 wherein the locating member includes a pair of rearwardly extending projections and the second spring means includes a pair of coil springs disposed in engagement with the projections.

6. The anti-theft device of claim 1 wherein the first L-shaped member includes a leg portion having a free end that is bent outwardly to define a divergent opening of the first hook.

7. The anti-theft device of claim 1 wherein the second L-shaped member includes a free end that is bent outwardly and the elongate rod member includes a free end that is bent outwardly, whereby the outwardly bent free ends of the elongate rod member and L-shaped hook collectively define a divergent opening of the second hook.

* * * * *